United States Patent Office 3,409,675
Patented Nov. 5, 1968

3,409,675
PARAFORMALDEHYDE DEPOLYMERIZATION SOLVENT MEDIA
James D. Atwood, Kingsville, Tex., and Max L. Jacobs, Livermore, Colo., assignors to Celanese Corporation, a corporation of Delaware
No Drawing. Filed Dec. 13, 1965, Ser. No. 513,591
3 Claims. (Cl. 260—606)

ABSTRACT OF THE DISCLOSURE

Disclosed herein is a process for depolymerizing paraformaldehyde in the presence of organic compounds which act as heat transfer media. The novel heat transfer media of this invention, such as trimethylolpropanetripelargonate, can withstand temperatures of 200° C. and above without decomposing.

---

This invention relates to depolymerization of paraformaldehyde. More particularly, it relates to the use of certain types of organic compounds as heat transfer media for depolymerization of paraformaldehyde at high temperatures to monomeric formaldehyde.

Depolymerization of paraformaldehyde in organic compounds, which act as heat transfer media, is well known. This reaction, which is endothermic, proceeds readily at elevated temperatures with or without a catalyst. Various organic compounds have been used as heat transfer media. However, when the depolymerization temperature is raised above about 180° C., most of these compounds suffer great volume losses through evaporation, decomposition, and side reactions. For example, the formation of solids during the uncatalyzed and phosphoric acid-catalyzed depolymerization of paraformaldehyde is quite common. These solids are apparently due to the interaction of the organic compounds used as heat transfer media or their breakdown products with formaldehyde, and from complex polymerization of formaldehyde.

Depolymerization reaction proceeds rapidly and with little or no fouling at about 200° C., but, as stated above, most of the organic compounds used as heat transfer media in the prior art suffer from volume losses, side reactions and increased decomposition at this high temperature. In addition, severe foaming often occurs. Thus, there is a need for compounds for use as heat transfer media for the paraformaldehyde depolymerization reaction which do not suffer from the above disadvantages.

It is an object of this invention to provide organic compounds for use as heat transfer media in the paraformaldehyde depolymerization reaction which do not decompose to an appreciable extent at a temperature of about 200° C. and above; which are substantially unreactive toward the reactants and products; and which suffer minimum volume losses through evaporation at such high temperatures.

The novel organic compounds of this invention are esters of polyols which contain at least three methylol groups and whose acid moieties contain from about 7 to 11 carbon atoms, and esters of epoxystearic acid whose alcohol moieties contain from about 7 to 9 carbon atoms. The acid moieties of any one ester of a polyol may be the same or different.

Pursuant to one particular embodiment of this invention an ester of a polyol which contains at least three methylol groups, or an ester of epoxy stearic acid, is charged to a reactor equipped with heating, stirring, formaldehyde gas collector and take-off for recycling. The temperature of the reactor is raised and maintained at the desired level for depolymerization. A slurry of paraformaldehyde and an ester of the above named types is fed continuously into the reactor and depolymerization proceeds rapidly. Tests are run on the recycled ester to determine free formaldehyde content, solids formation, formaldehyde polymerization, pH, decomposition and volume loss of compounds used for heat transfer media.

Typical esters of polyols which contain at least three methylol groups and esters of epoxystearic acid contemplated herein are tri-heptylate, tri-caprylate, tri-pelargonate, tri-caprate and tri-undecylate esters of trimethylolethane, trimethylolpropane and trimethylolbutane; tetraheptylate, tetra-caprylate, tetra-pelargonate, tetra-caprate and tetra-undecylate esters of pentaerythritol; and 4-methyl-n-heptyl, methyl-n-heptyl, 5-methyl-n-heptyl, iso-octyl, n-octyl, n-heptyl, sec-carpyl, 4-methyl-n-pentyl, 2-ethyl-n-hexyl and di-n-butyl esters of epoxystearic acid.

In carrying out the practice of this invention, paraformaldehyde is mixed with the ester to form a slurry of about 15% by weight of paraformaldehyde. This slurry is fed into a reactor containing an additional quantity of this ester. The final ratios of paraformaldehyde to ester range preferably between about 0.05:1 to 0.2:1 and the feed rates of paraformaldehyde slurry range preferably from about 10 ml./min. to 50 ml./min. Depolymerization can be conducted at temperatures ranging from about 180° C. to 210° C., but temperature of about 200° C. is preferred. The preferred pressure for depolymerization is atmospheric; however, reduced pressures can also be employed. Depolymerization may be conducted with or without a catalyst or antifoaming agent. However, an antifoaming agent is preferable where the depolymerization reaction extends over long periods of time. A single compound may serve as both an antifoaming agent and catalyst. Such compounds may be mixed with both the ester and the paraformaldehyde slurry in concentrations of about 0.005 to 0.10. Applicable compounds which serve both as antifoaming agents and as catalysts are sulfuric acid, methanesulfonic acid, benzenesulfonic acid, and toluenesulfonic acid.

A typical ester of a polyol which contains at least three methylol groups, e.g. trimethylolpropane tripelargonate, is employed to demonstrate this invention. All weights in the examples below are designated as parts by weight unless otherwise specified.

EXAMPLE I

About 2000 parts by weight of trimethylolpropanetripelargonate was placed into a reactor and the temperature was raised and maintained at about 200° C. About 25 parts by weight of a slurry of paraformaldehyde and trimethylolpropanetripelargonate of approximately 15% by weight of paraformaldehyde was fed into the reactor in a semi-continuous manner at a feed rate of 30.5 ml./min. After about 12 hours, trimethylolpropanetripelargonate showed little or no tendency to foam and analysis of the recycled trimethylolpropanetripelargonate for free formaldehyde, solids and acid number showed 0.07%, 0.057%, and 0.15, respectively.

When the depolymerization reaction in Example I above was extended to 22 hours, analysis on the recycled trimethylolpropanetripelargonate showed an increase in the percent of solids, e.g. 1.11%. However, the values for acid number and percent formaldehyde remained constant. After 22 hours severe foaming occurred. A comparison of paraformaldehyde depolymerization in trimethylolpropanetripelargonate at 200° C. with dioctyl phthalate at 180° C. showed the former to be superior to the latter in feed rates which reflect the rates of reaction (30.5 ml/min. to 17–21 ml./min.), free formaldehyde in recycled ester, solids formation, decomposition and volume loss of the heat transfer compounds.

EXAMPLE II

The reactants, parts by weight and conditions as stated in Example I are the same, except that the depolymerization was run for 17½ hours at a feed rate of 19.5 ml./min. At this point foaming began to occur. However, analysis of the recycled trimethylolpropanetripelargonate for free formaldehyde, solids and acid number showed 0.07%, 0.18% and 0.22, respectively. At this point the trimethylolpropanetripelargonate in the reactor and the subsequently added slurry paraformaldehyde were acidified with a 0.05% concentration of $H_2SO_4$. The foaming immediately stopped and no further foaming was observed through 36 additional hours of operation. Analysis of the recycled trimethylolpropanetripelargonate at 24 hours for free formaldehyde, solids, and acid numbers gave 0%, 0.02% and 0.67, respectively. When the temperature of the reactor was raised to 210° C. and the feed rate increased, depolymerization proceeded more rapidly and smoothly, and without foaming. This example shows that there was very little buildup of solids, no decomposition of trimethylolpropanetripelargonate, very little loss of trimethylolpropanetripelargonate through evaporation, no foaming and depolymerization of paraformaldehyde to monomeric formaldehyde was rapid and efficient. Similar results were noted when a representative epoxystearate ester, e.g. iso-octyl epoxystearate, was employed as depolymerization solvent.

Comparative evaporation rates of various depolymerization heat transfer solvents are listed below. These rates were run at favored temperature, e.g. 200° C., and for a length of time comparable to short plant runs. Dioctyl phthalate is listed to furnish a basis for comparison between typical heat exchange solvents of the prior art and those of the instant invention.

| Liquid | Temp., °C. | Hours Heated | Percent Weight Loss |
|---|---|---|---|
| Dioctyl phthalate | 180 | 30 | 8.4 |
| Dioctyl phthalate | 200 | 30 | 28.5 |
| Trimethylolpropanetripelargonate | 200 | 30 | 2.0 |
| Iso-octyl expoxystearate | 200 | 30 | 6.2 |

It is to be understood that the foregoing detailed description is given merely by way of illustration and that many variations may be made therein without departing from the spirit of our invention.

The embodiments of the invention in which an exclusive property or privilege is claimed are defined as follows:

1. In the process of preparing formaldehyde by the depolymerization of paraformaldehyde in compounds used as heat transfer media the improvement which consists of conducting said depolymerization in a compound selected from the group consisting of tri-heptylate, tri-caprylate, tri-pelargonate, tri-caprate and tri-undecylate esters of trimethylolpropane, trimethylolethane, and trimethylolbutane; tetra-heptylate, tetra-caprylate, tetra-pelargonate, tetra-caprate and tetra-undecylate esters of pentaerythritol; and 4-methyl-n-heptyl, 5-methyl-n-heptyl, iso-octyl, n-heptyl, sec-capryl, 4-methyl-n-pentyl, 2-ethyl-n-hexyl, di-n-butyl, n-octyl and methyl-n-heptyl esters of epoxystearic acid; at a temperature of about 180° C. to about 210° C.

2. The process of claim 1, wherein a compound which acts both as an antifoaming agent and a catalyst is added, said compound being selected from the group consisting of sulfuric acid, methanesulfonic acid, benzene-sulfonic acid and toluenesulfonic acid.

3. The process of claim 2, wherein said compound which is used as heat transfer medium is trimethylolpropanetripelargonate.

References Cited

UNITED STATES PATENTS 3,268,591   8/1966   Sloan et al. ---------- 260—606

FOREIGN PATENTS 1,002,381   8/1965   Great Britain.
467,405   8/1950   Canada.

LEON ZITVER, *Primary Examiner.*

R. H. LILES, *Assistant Examiner.*